US012718364B2

(12) United States Patent
Kim

(10) Patent No.: US 12,718,364 B2
(45) Date of Patent: Aug. 25, 2026

(54) ORAL CAVITY IMAGE PROCESSING APPARATUS AND ORAL CAVITY IMAGE PROCESSING METHOD

(71) Applicant: MEDIT CORP., Seoul (KR)

(72) Inventor: Dusu Kim, Seoul (KR)

(73) Assignee: MEDIT CORP., Seoul (KR)

( * ) Notice: Subject to any disclaimer, the term of this patent is extended or adjusted under 35 U.S.C. 154(b) by 292 days.

(21) Appl. No.: 18/580,947

(22) PCT Filed: Jul. 21, 2022

(86) PCT No.: PCT/KR2022/010682
§ 371 (c)(1),
(2) Date: Jan. 19, 2024

(87) PCT Pub. No.: WO2023/003381
PCT Pub. Date: Jan. 26, 2023

(65) Prior Publication Data

US 2025/0104224 A1 Mar. 27, 2025

(30) Foreign Application Priority Data

Jul. 21, 2021 (KR) ........................ 10-2021-0096002
Jan. 7, 2022 (KR) ........................ 10-2022-0002782

(51) Int. Cl.
*G06K 9/00* (2022.01)
*G06T 7/00* (2017.01)
*G06T 17/00* (2006.01)

(52) U.S. Cl.
CPC ............ *G06T 7/0012* (2013.01); *G06T 17/00* (2013.01); *G06T 2207/30036* (2013.01)

(58) Field of Classification Search
None
See application file for complete search history.

(56) References Cited

U.S. PATENT DOCUMENTS

2020/0306017 A1* 10/2020 Chavez .................... A61C 7/08

FOREIGN PATENT DOCUMENTS

CN 104200729 A 12/2014
CN 107212938 A 9/2017

(Continued)

OTHER PUBLICATIONS

Youtube, making drain holes, posted date: Mar. 13, 2021. Retrieved from <URL: https://www.youtube.com/watch?v=hsF6GlgT24k>.

(Continued)

*Primary Examiner* — Sj Park
(74) *Attorney, Agent, or Firm* — Sughrue Mion, PLLC

(57) ABSTRACT

Embodiments of the disclosure relate to an intraoral image processing method and an intraoral image processing device, wherein the intraoral image processing method according to an embodiment may include obtaining three-dimensional intraoral data that is data from scanning an object, generating a base, based on the three-dimensional intraoral data, generating, based on the base, a cylinder that penetrates through a wall of the base, generating a drain hole by deleting data corresponding to the cylinder from teeth model data including the base, and displaying the teeth model data in which the drain hole is generated.

15 Claims, 12 Drawing Sheets

(56) References Cited

FOREIGN PATENT DOCUMENTS

| | | | | |
|---|---|---|---|---|
| CN | 111449781 | A | 7/2020 | |
| EP | 3673863 | A1 * | 7/2020 | ......... A61C 13/0004 |

OTHER PUBLICATIONS

YouTube. UPDATED How to quickly hollow and base models for printing, posted date: Apr. 30, 2020. Retrieved from <URL: https://www.youtube.com/watch?v=wwbccllatNg>.

Office Action from the Korean Intellectual Property Office dated Oct. 25, 2023.

International Search Report for PCT/KR2022/010682 dated Nov. 3, 2022.

* cited by examiner

FIG. 3

ORAL CAVITY IMAGE PROCESSING APPARATUS AND ORAL CAVITY IMAGE PROCESSING METHOD

This Application is a National Stage of International Application No. PCT/KR2022/010682 filed Jul. 21, 2022, claiming priority based on Korean Patent Application No. 10-2021-0096002 filed Jul. 21, 2021 and Korean Patent Application No. 10-2022-0002782 filed Jan. 7, 2022.

TECHNICAL FIELD

An embodiment of the disclosure relates to an intraoral image processing device and an intraoral image processing method, and more particularly, to an intraoral image processing device and an intraoral image processing method capable of generating a drain hole in teeth model data.

BACKGROUND ART

There are various fields in dental treatment for patients. The fields of dentistry may include, for example, orthodontics and prosthetic dentistry. In orthodontic and prosthetic treatments, a teeth model of a patient may be needed. The teeth model may be used as an objective source for showing shapes of teeth before, during, and after orthodontic treatment. Also, by making the teeth model, a portion which is difficult to be directly observed due to a limited space in an oral cavity may be easily observed. Plus, misaligned teeth, projecting teeth, and spaces for resolving a space may be accurately measured. Also, when a medic counsels a patient, a teeth model may be used as an objective source for showing an intraoral state of the patient, thereby helping the patient's understanding. In addition, an instrument which is difficult to be directly made in an oral cavity of a patient may be manufactured through a model.

The teeth model may be manufactured by a three-dimensional (3D) printer, and in a manufacturing process by the 3D printer, a material (resins) is required. In this case, in order to save the material (the resins), the teeth model may be often manufactured as a hollow model. In order to manufacture a teeth model as a hollow model, a drain hole for removing resins inside the teeth model is needed.

In more detail, when a bottom surface of the hollow model is attached to a build plate, a drain hole is used for removing internal pressure or discharging resins to the outside. Alternatively, when a teeth model is manufactured as a hollow model, a drain hole is used for saving a resin material or saving the printing time. Alternatively, a drain hole is used for easily removing a teeth model from a build plate after a printing process on the teeth model.

Therefore, in order to manufacture a teeth model as a hollow model, an operation of generating a drain hole in the teeth model is required.

DISCLOSURE

Technical Problem

According to an embodiment of the disclosure, there are provided an intraoral image processing method capable of generating a drain hole in a teeth model, and a device for performing corresponding operations.

Technical Solution

An intraoral image processing method according to an embodiment may include obtaining three-dimensional intraoral data that is data from scanning an object, generating a base, based on the three-dimensional intraoral data, generating, based on the base, a cylinder that penetrates through a wall of the base, generating a drain hole by deleting data corresponding to the cylinder, from teeth model data including the base, and displaying the teeth model data in which the drain hole is generated.

The generating of the cylinder according to an embodiment may include receiving a user input with respect to a number of cylinders, a diameter of the cylinder, and a distance from the base to the cylinder.

The generating of the cylinder according to an embodiment may further include determining a position of the cylinder based on a number of cylinders and a distance from the base to the cylinder.

The generating of the cylinder according to an embodiment may include determining one or more reference points with respect to the cylinder, generating rays from the one or more reference points and, based on points at which the rays intersect the base, determining a height of a side surface of the cylinder such that the cylinder penetrates through the wall of the base, and generating the cylinder, based on the determined height of the side surface.

The determining of the one or more reference points according to an embodiment may include, based on an outline of the base and a thickness of the wall of the base, determining a position of a reference circle having a diameter of a bottom surface of the cylinder, and determining one or more points included in the reference circle as the one or more reference points.

The rays according to an embodiment may include first rays having a first direction and second rays having a second direction that is opposite to the first direction, and the determining of the height of the side surface of the cylinder may include determining a minimum point of the side surface of the cylinder, based on first points at which a normal vector is in the first direction, from among points at which the first rays intersect the base, determining a maximum point of the side surface of the cylinder, based on second points at which a normal vector is in the second direction, from among points at which the second rays intersect the base, and determining the height of the side surface of the cylinder, based on a vertical distance between the minimum point and the maximum point.

The determining of the height of the side surface of the cylinder according to an embodiment may further include determining the height of the side surface of the cylinder by additionally applying a pre-set value to the determined maximum point and the determined minimum point.

The intraoral image processing method according to an embodiment may further include obtaining a teeth region including teeth in the three-dimensional intraoral data, and the generating of the drain hole may include, based on whether or not the cylinder overlaps the teeth region, deleting data corresponding to the cylinder.

The intraoral image processing method according to an embodiment may further include obtaining the teeth model data including the base by generating mesh data extending from a boundary of the three-dimensional intraoral data to the base.

An intraoral image processing device according to an embodiment may include a display, a memory storing one or more instructions, and a processor configured to execute the one or more instructions stored in the memory to obtain three-dimensional intraoral data that is data from scanning an object, generate a base, based on the three-dimensional intraoral data, generate, based on the base, a cylinder that penetrates through a wall of the base, generate a drain hole by deleting data corresponding to the cylinder from teeth model data including the base, and control the display to display the teeth model data in which the drain hole is generated.

Advantageous Effects

By an intraoral image processing device and an intraoral image processing method, according to an embodiment of the disclosure, a drain hole may be generated to penetrate through a wall of a base. Thus, when a teeth model is manufactured as a hollow model, inside materials (for example, resins) may be easily discharged to the outside through the drain hole, so that the resin materials may be saved and the printing time may be reduced.

DESCRIPTION OF DRAWINGS

The disclosure may be easily understood based on the combination of the following detailed descriptions and the accompanying drawings, and reference numerals indicate structural elements.

FIGS. 3 and 4 are diagrams for describing an operation, performed by an intraoral image processing device, of generating a drain hole, according to an embodiment.

MODE FOR INVENTION

Figure 1:
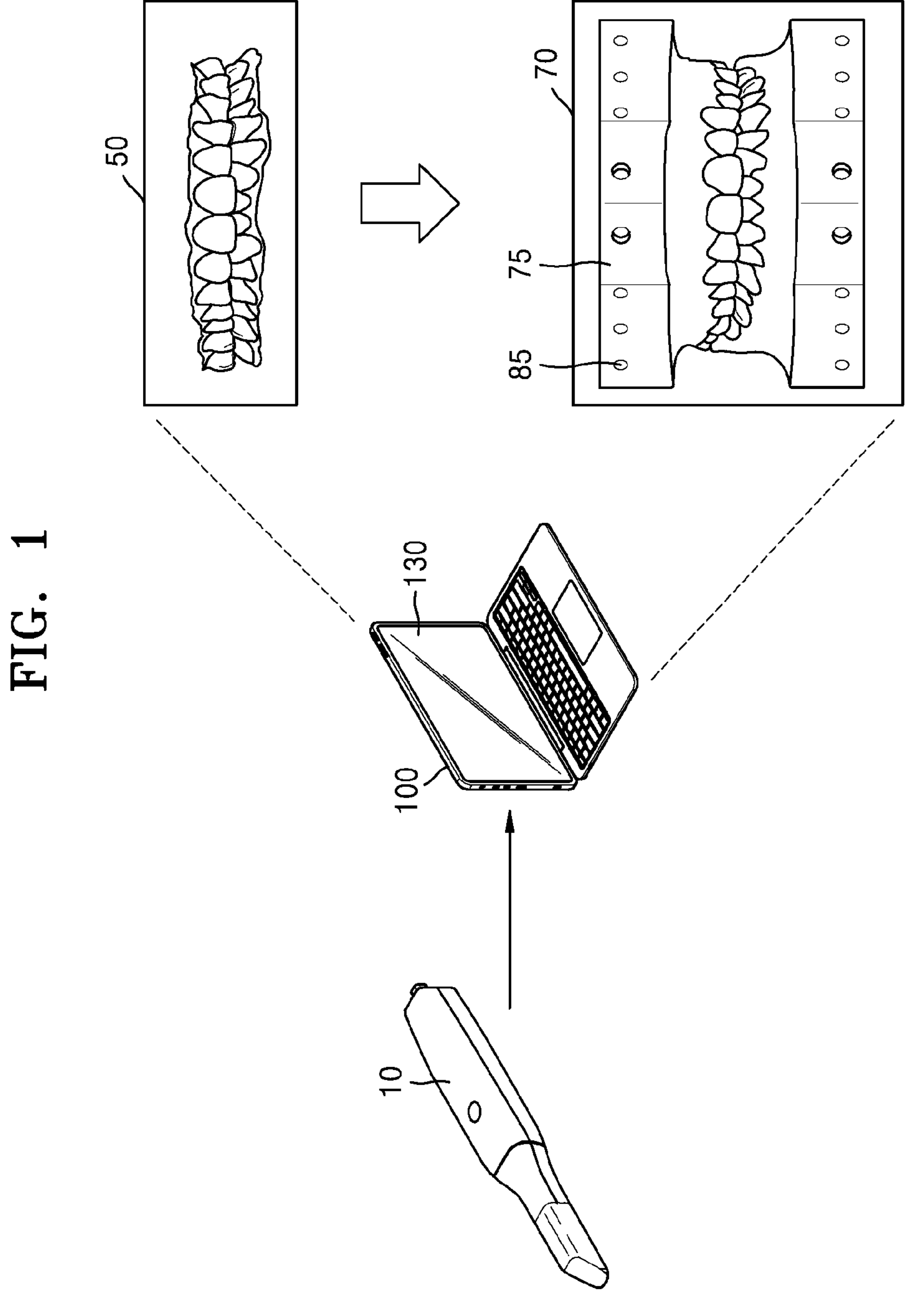
FIG. 1 is a diagram for describing an intraoral image processing system, according to an embodiment of the disclosure.

In this specification, principles of the disclosure are described and embodiments are disclosed, in order to clarify the scope of the claims of the disclosure and clearly convey the disclosure for one of ordinary skill in the art to implement the disclosure. The embodiments of the disclosure may be implemented in various forms.

Throughout the specification, like reference numerals refer to like elements. Not all elements of the embodiments are described in this specification, and general aspects in the art or the same aspects of the embodiments are not described. The term "part" or "portion" used in the specification may be implemented as software or hardware, and according to embodiments, a plurality of "units" may be implemented as one unit (element), or one "unit" may include a plurality of units (elements). Hereinafter, by referring to the accompanying drawings, the operating principles and the embodiments of the disclosure are described.

In this specification, an image may include an image (hereinafter, an "intraoral image") indicating at least one tooth or an oral cavity including at least one tooth.

Also, in this specification, an image may include a two-dimensional (2D) image with respect to an object or a three-dimensional (3D) model or a 3D image three-dimensionally representing an object. Also, in this specification, an image may denote data needed to two-dimensionally or three-dimensionally represent an object, for example, raw data, etc. obtained from at least one image sensor. In detail, the raw data is data obtained to generate an intraoral image. When an object, which is an oral cavity of a patient, is scanned by using an intraoral scanner, the raw data may be data (for example, 2D data) obtained by at least one image sensor included in the intraoral scanner.

In this specification, an "object" may include a tooth, gingiva, at least a portion of an oral cavity, and/or an artificial structure (for example, an orthodontic appliance, an implant, an artificial tooth, an orthodontic auxiliary instrument inserted into the oral cavity, etc.) which may be inserted into the oral cavity. Here, the orthodontic appliance may include at least one of a bracket, an attachment, an orthodontic screw, a lingual orthodontic appliance, and a removable orthodontic-maintenance appliance.

Hereinafter, embodiments are described in detail with reference to the drawings.

FIG. 1 is a diagram for describing an intraoral image processing system according to an embodiment of the disclosure.

Referring to FIG. 1, the intraoral image processing system may include an intraoral scanner 10 and an intraoral image processing device 100.

The intraoral scanner 10 according to an embodiment may be a device configured to scan an object and may be a medical device for obtaining an image in an oral cavity. Also, the intraoral scanner 10 may be configured to scan at least a portion of a human body, such as a face of a patient, in addition to the oral cavity, or a teeth model.

FIG. 1 illustrates the intraoral scanner 10 as a type of hand-held scanner which is held by a user in his or her hand and is used to scan an object. However, the intraoral scanner 10 is not limited thereto and may include a type of model scanner, etc. whereby a teeth model is mounted and the mounted teeth model is scanned while moving.

In detail, the intraoral scanner 10 may be a device inserted into an oral cavity and scanning teeth in a non-contact way for obtaining an image with respect to an oral cavity including one or more teeth. Also, the intraoral scanner 10 may have a form that is possible to be inserted into and withdrawn from an oral cavity and may scan an internal state of the oral cavity of a patient by using at least one image sensor (for example, an optical camera, etc.). The intraoral scanner 10 may obtain surface information with respect to an object, as raw data, in order to image a surface of at least one of objects including a tooth in the oral cavity, gingiva, and an artificial structure (e.g., an orthodontic device including a bracket, a wire, etc., an implant, an artificial tooth, an orthodontic auxiliary instrument inserted into the oral cavity, etc.) which may be inserted into the oral cavity.

Image data obtained by the intraoral scanner 10 may be transmitted to the intraoral image processing device 100 connected to the intraoral scanner 10 through a wired or wireless communication network.

The intraoral image processing device 100 may include all types of electronic devices which are connected to the intraoral scanner 10 through a wired or wireless communication network and capable of receiving, from the intraoral scanner 10, a 2D image obtained by scanning an oral cavity, and generating, processing, displaying, and/or transmitting an intraoral image based on the received 2D image.

Based on 2D image data received from the intraoral scanner 10, the intraoral image processing device 100 may generate information by processing the 2D image data or may generate an intraoral image by processing the 2D image data. Also, the intraoral image processing device 100 may display the generated information and the generated intraoral image through a display 130.

The intraoral image processing device 100 may include a computing device, such as a smartphone, a laptop computer, a desk top computer, a personal digital assistant (PDA), a tablet personal computer (PC), etc., but is not limited thereto.

Also, the intraoral image processing device 100 may also be implemented as a server (or a server device) configured to process an intraoral image.

Also, the intraoral scanner 10 may directly transmit the raw data obtained through intraoral scanning to the intraoral image processing device 100. In this case, the intraoral image processing device 100 may generate, based on the received raw data, a 3D intraoral image three-dimensionally representing the oral cavity. The intraoral image processing device 100 according to an embodiment may generate, based on the received raw data, the 3D data (for example, surface data, mesh data, etc.) three-dimensionally representing a shape of the surface of the object.

Also, the "3D intraoral image" may be generated by three-dimensionally modeling an internal structure of the oral cavity based on the received raw data, and thus, may also be referred to as a "3D intraoral model." Hereinafter, models and images two-dimensionally or three-dimensionally representing an oral cavity may be collectively referred to as "intraoral images."

Also, the intraoral image processing device 100 may analyze, process, display, and/or transmit, to an external device, the generated intraoral image.

As another example, the intraoral scanner 10 may obtain the raw data through intraoral scanning, may generate, by processing the obtained raw data, an image corresponding to the oral cavity, which is the object, and may transmit the generated image to the intraoral image processing device 100. In this case, the intraoral image processing device 100 may analyze, process, display, and/or transmit the received image.

According to an embodiment of the disclosure, detailed descriptions are given below based on the intraoral image processing device 100 being an electronic device capable of generating and displaying an intraoral image three-dimensionally indicating an oral cavity including one or more teeth.

The intraoral image processing device 100 according to an embodiment may generate a 3D intraoral image (or a 3D intraoral model) by processing received raw data, when the intraoral image processing device 100 receives, from the intraoral scanner 10, the raw data obtained by scanning an oral cavity. For convenience of explanation, the 3D intraoral image generated by the intraoral image processing device 100 may be referred to as "scan data" hereinafter.

The raw data received from the intraoral scanner 10 may include teeth data indicating teeth and gingiva data indicating gingiva. Accordingly, the scan data generated by the intraoral image processing device 100 may include a teeth region and a gingiva region. However, the scan data is not limited thereto.

According to an embodiment, when a teeth model is generated by using only scan data 50, it may not be possible to accurately identify a dental occlusion because an upper jaw and a lower jaw included in the scan data 50 are just separated. Accordingly, the teeth model may have to be generated to have a shape in which articulation may be attached for coupling the upper jaw and the lower jaw not to deviate from each other. In order to generate the teeth model to have the shape in which it is possible to attach the articulation, teeth model data 70 combining a base 75 may have to be generated.

The intraoral image processing device 100 according to an embodiment may generate the teeth model data 70 combining the base 75, by using a teeth region and a portion of a gingiva region of the scan data 50. Here, the intraoral image processing device 100 may extend the gingiva region to the base 75 by generating 3D data (for example, mesh data) between an edge of the gingiva region and the base 75.

Also, the teeth model may be manufactured as a hollow model in which the base 75 is empty, so that less material is used. In order to manufacture the teeth model as the hollow model, a drain hole 85 for discharging a material (for example, resins) inside the teeth model to the outside may be needed. Here, in order to discharge the material through the drain hole 85, the drain hole 85 may have to be formed to penetrate through a wall of the base 75. Hereinafter, with reference to the drawings, a method, performed by the intraoral image processing device 100, of generating the drain hole 85 to penetrate through the wall of the base 75 included in teeth model data, according to an embodiment, is described.

Figure 2:
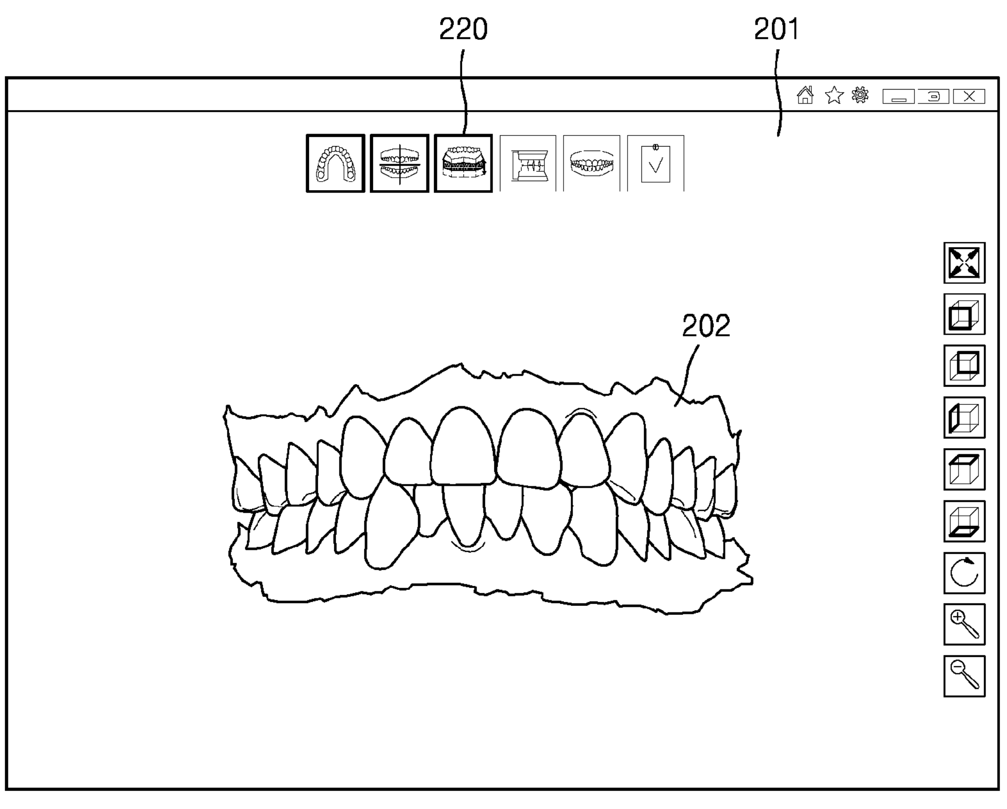
FIG. 2 is a reference diagram for describing an operation, performed by an intraoral image processing device, of obtaining scan data in order to generate teeth model data, according to an embodiment.

FIG. 2 is a reference diagram for describing an operation, performed by an intraoral image processing device, of obtaining scan data in order to generate teeth model data, according to an embodiment.

The intraoral image processing device 100 according to an embodiment may generate the scan data, based on raw data obtained by the intraoral scanner 10. Alternatively, the intraoral image processing device 100 may obtain the scan data by using a function of "loading" pre-stored scan data or may obtain the scan data from an external device. However, the disclosure is not limited thereto.

The intraoral image processing device 100 may visually output scan data 202 through a user interface screen 201. The user interface screen 201 may be a screen of the display 130 of FIG. 1. The user interface screen 201 may include one or more menus through which a user may analyze or process the scan data 202.

For example, the user interface screen 201 may include a base generation menu 220. When a user input for selecting the base generation menu 220 is received, the intraoral image processing device 100 may enter into a base generation mode.

In the base generation mode, the intraoral image processing device 100 according to an embodiment may generate a base corresponding to the scan data and may provide menus for setting a type of the base, a height of the base, whether or not to apply a hollow model, a thickness of a wall of the hollow model, the number of drain holes, etc., which are required for generation of the base.

Figure 3:
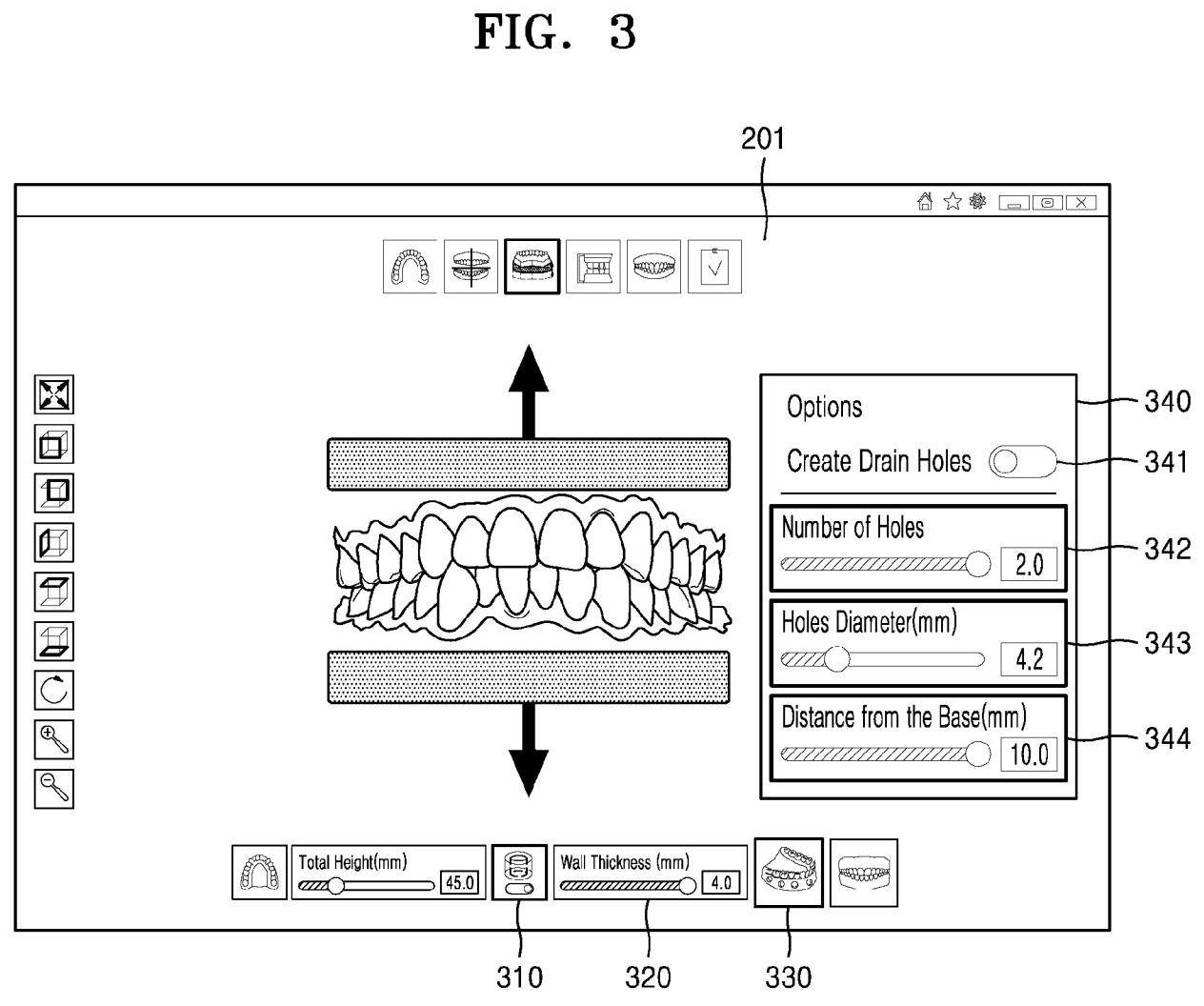
Figure 4:
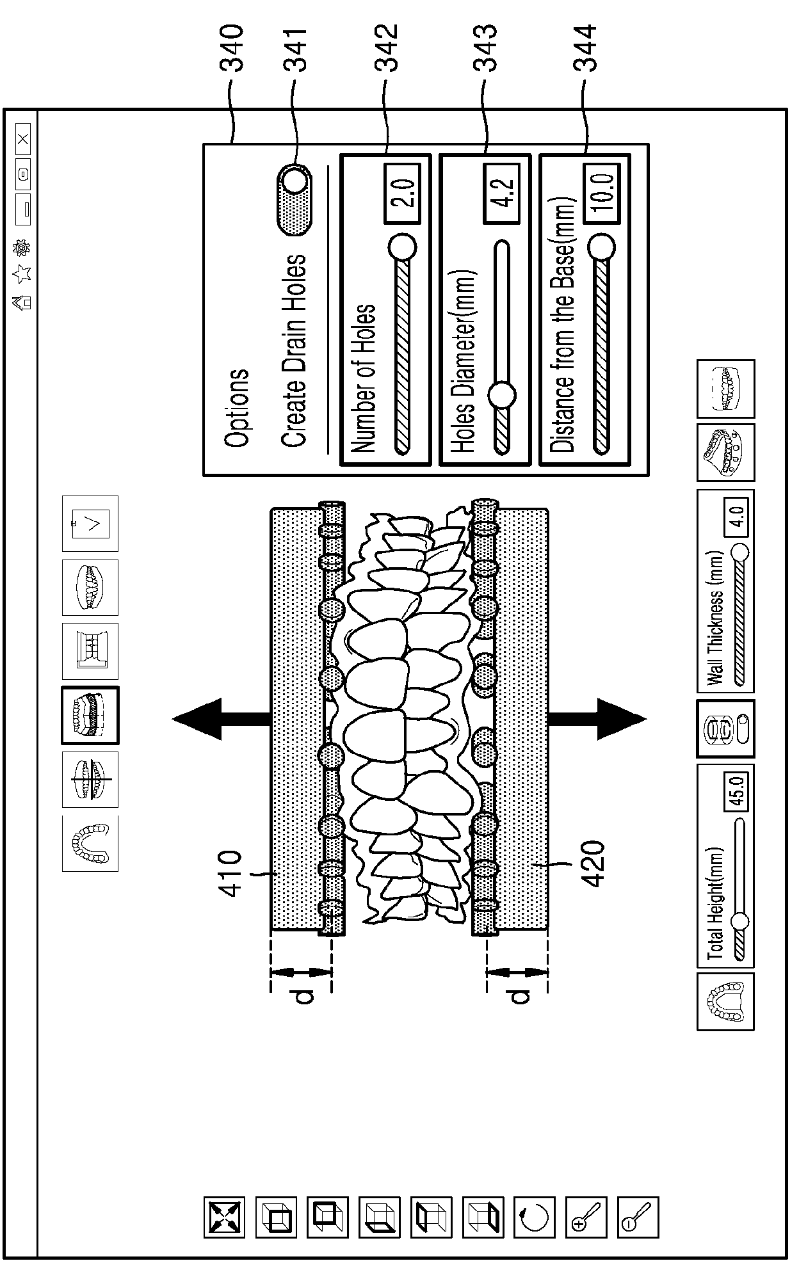

FIGS. 3 and 4 are diagrams for describing an operation, performed by an intraoral image processing device, of generating a drain hole, according to an embodiment.

Referring to FIG. 3, in a base generation mode, the intraoral image processing device 100 according to an embodiment may display, on the user interface screen 201, a menu 310 for selecting a hollow model and a slider 320 for adjusting a thickness of a wall of the base. The intraoral image processing device 100 may receive a user input for adjusting the thickness of the wall of the base, by using a user input for selecting the hollow model menu 310 and the slider 320.

Also, when, based on the user input, a hollow model is selected, the intraoral image processing device 100 may display a drain hole generation menu 330 on the user interface screen 201 or may activate the drain hole generation menu 330.

Also, when, based on the user input, the drain hole generation menu 330 is selected, the intraoral image processing device 100 may display a drain hole setting menu 340 on the user interface screen 201, as illustrated in FIG. 3. Here, when a drain hole generation button 341 included in the drain hole setting menu 340 is in an off state, menus 342, 343, 344 for setting information with respect to a drain hole may be non-activated.

When a user input for turning on the drain hole generation button 341 is received, the intraoral image processing device 100 may activate the menus 342, 343, and 344 for setting information with respect to a drain hole, as illustrated in FIG. 4. The menus for setting information with respect to a drain hole may include drain hole setting menus for setting the number of drain holes, a diameter of a drain hole, and a distance from a base to a drain hole.

For example, the drain hole setting menu 340 may include a first slider 342 for adjusting the number of drain holes, a second slider 343 for adjusting the diameter of the drain hole, and a third slider 344 for adjusting a vertical height from a bottom surface of the base to the drain hole. However, the drain hole setting menu 340 is not limited thereto.

When the information with respect to the drain hole is set through the drain hole setting menu 340, the intraoral image processing device 100 may generate one or more cylinders corresponding to one or more drain holes.

Here, the intraoral image processing device 100 according to an embodiment may determine a position of the cylinders, based on the number of drain holes and the distance from the base to the drain hole.

The intraoral image processing device 100 may determine a vertical position of the cylinders, based on the set distance from the base to the drain hole.

For example, when the distance from the base to the drain hole is set as d (for example, 10 mm), the intraoral image processing device 100 may adjust the vertical position of the cylinders such that a distance from an upper surface of an upper jaw base 410 to a central axis of the cylinders becomes d (for example, 10 mm) and may adjust the vertical position of the cylinders such that a distance from a lower surface of a lower jaw base 420 to a central axis of the cylinders becomes d (for example, 10 mm).

With reference to FIG. 4, it is illustrated and described that the distance from the upper jaw base 410 to the cylinders and the distance from the lower jaw base 420 to the cylinders are adjusted to be the same as each other. However, the distance from the upper jaw base 410 to the cylinders and the distance from the lower jaw base 420 to the cylinders are not limited thereto and may be differently set.

Also, the intraoral image processing device 100 may determine a horizontal position of the cylinders, based on the number of drain holes and a boundary of the base.

This aspect is to be described in detail with reference to FIG. 5.

Figure 5:
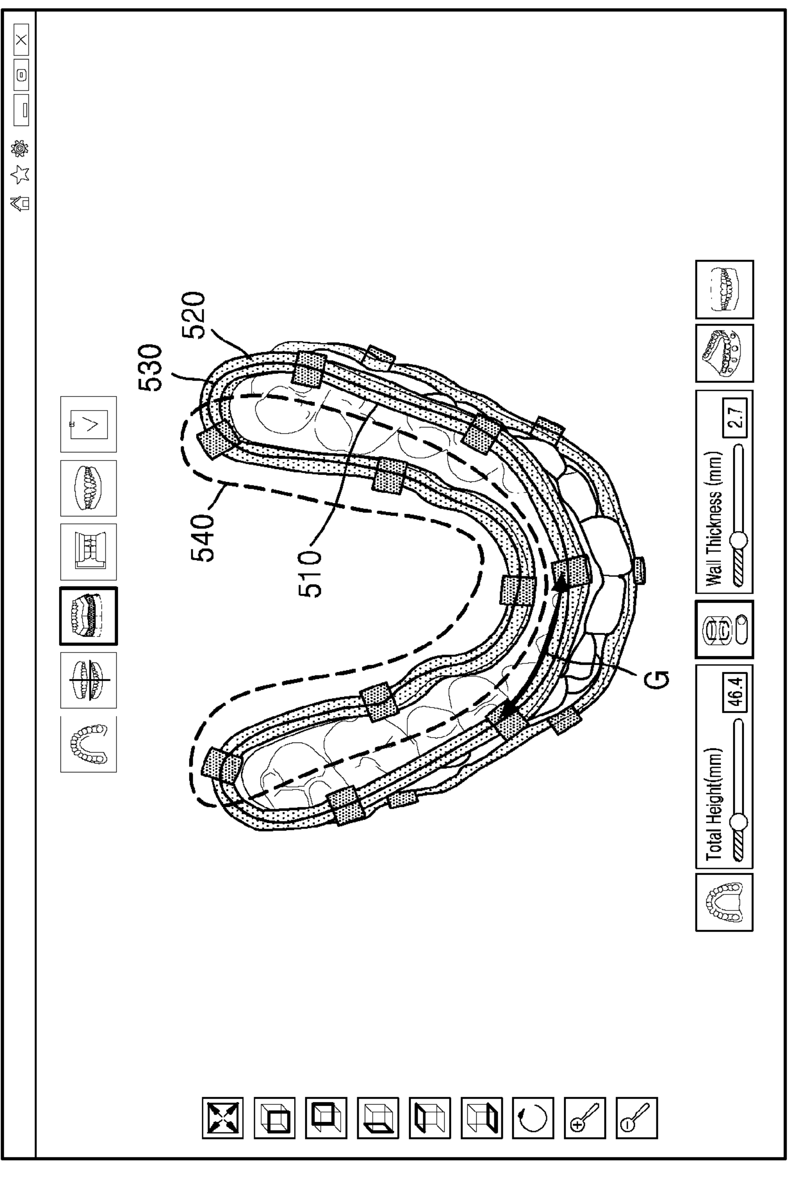
FIG. 5 is a diagram for describing an operation, performed by an intraoral image processing device, of determining a position of a drain hole, according to an embodiment.

FIG. 5 is a diagram for describing an operation, performed by an intraoral image processing device, of determining a position of a drain hole, according to an embodiment.

Referring to FIG. 5, the intraoral image processing device 100 may calculate a gap G between the cylinders by dividing a length of any one of an inner boundary 510 of a base, an outer boundary 520 of the base, and an intermediate line 530 connecting points in the middle of the base in a thickness direction by the number of drain holes.

For example, when the gap G between the drain holes is calculated by dividing the length of the inner boundary 510 of the base by the number of drain holes, the intraoral image processing device 100 may determine a first point from among points included in the inner boundary 510 as a position of a first cylinder and may determine a second point apart from the first point by the gap G calculated according to the inner boundary 510 as a position of a second cylinder. The intraoral image processing device 100 may determine positions of one or more cylinders by using the same method as described above. Accordingly, when the number of drain holes increases, the gap G between the cylinders may decrease, and when the number of drain holes decreases, the gap G between the cylinders may increase.

Alternatively, when it is set such that the drain hole is generated only in a lingual direction of teeth, due to labeling, etc., the intraoral image processing device 100 may generate cylinders only in a corresponding base region 540, based on the base region 540 positioned in the lingual direction of teeth. For example, a gap between the drain holes may be obtained by dividing, by the number of drain holes, a length of any one of an inner boundary, an outer boundary, and an intermediate line included in the base region 540 positioned in the lingual direction, and cylinders corresponding to the drain holes may be generated only in the corresponding base region 540. However, the disclosure is not limited thereto, and the gap between the cylinders may not be the same and may be arbitrarily set.

Alternatively, the intraoral image processing device 100 may adjust a horizontal position of the cylinder and the gap between the cylinders, based on an input of dragging and moving the cylinder displayed on a user interface screen. However, the disclosure is not limited thereto.

Also, the intraoral image processing device 100 may determine a direction of a central axis of the cylinder, based on an outline of the base. However, the disclosure is not limited thereto.

Referring to FIG. 4 again, the intraoral image processing device 100 may determine a diameter of a bottom surface of the cylinders according to a diameter of the drain hole. For example, when the diameter of the drain hole is set to be 4.2 mm, the intraoral image processing device 100 may generate the cylinders such that the diameter of the bottom surface of the cylinders becomes 4.2 mm.

The drain holes according to an embodiment may have to be generated to penetrate through a wall of the base, in order to discharge an internal material (resins). Thus, a height of a side surface of the cylinders corresponding to the drain holes may have to be determined such that the cylinders may penetrate through the wall of the base. Here, the height of the side surface of the cylinders may be determined based on a maximum point and a minimum point of the side surface.

Hereinafter, by referring to the drawings, a method of determining the height of the side surface of the cylinders is described.

Figure 6:
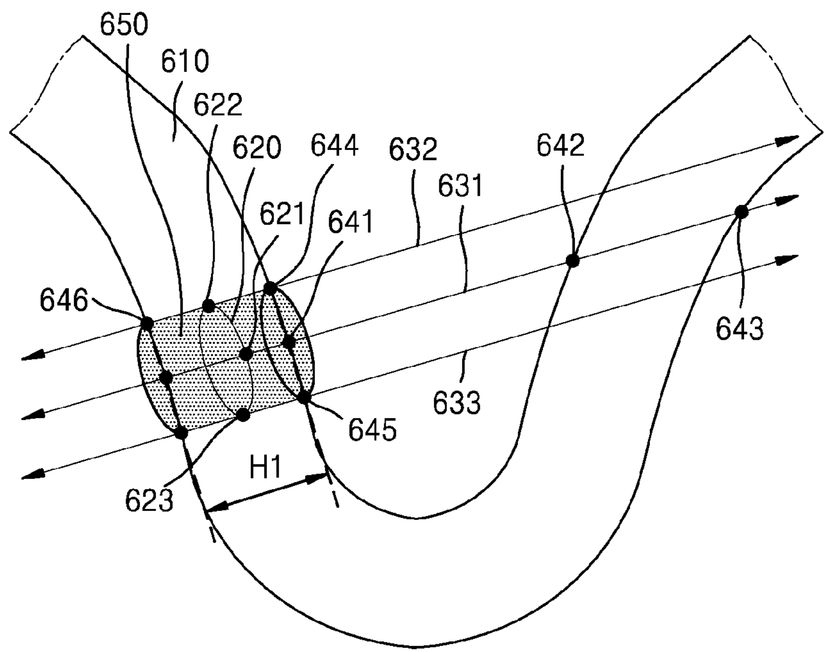
FIG. 6 is a diagram for describing an operation, performed by an intraoral image processing device, of determining a height of a side surface of cylinders, according to an embodiment.

FIG. 6 is a diagram for describing an operation, performed by an intraoral image processing device, of determining a height of a side surface of cylinders, according to an embodiment.

FIG. 6 is a diagram illustrating a portion of the base illustrated in FIG. 5. The intraoral image processing device 100 according to an embodiment may determine reference points with respect to the cylinder, when a position of the cylinder, a direction of a central axis of the cylinder, and a diameter of a bottom surface of the cylinder are determined. For example, as illustrated in FIG. 6, a reference circle 620 having the diameter of the bottom surface of the cylinder may be positioned in a middle point of a wall of a base 610. Here, the reference circle 620 may be positioned such that a direction of a normal vector of the reference circle 620 corresponds to the direction of the central axis of the cylinder. The intraoral image processing device 100 may determine one or more of points included in the reference circle 620 as reference points with respect to the cylinder. For example, the intraoral image processing device 100 may obtain n points positioned at a boundary of n sections, by dividing a circumference of the reference circle 620 by the n sections, and may determine the obtained n points as the reference points. Also, the intraoral image processing device 100 may also determine a central point of the reference circle 620 as the reference point.

The intraoral image processing device 100 may generate rays in a first direction and a second direction that is opposite to the first direction from the reference points.

The intraoral image processing device 100 according to an embodiment may determine a minimum point and a maximum point of the side surface of the cylinder, based on points at which the rays intersect the base 610. The intraoral image processing device 100 may determine a vertical distance between the minimum point and the maximum point, the vertical distance being parallel to the central axis of the cylinder, as the height of the side surface of the cylinder.

For example, the intraoral image processing device 100 may determine the maximum point of the side surface of the cylinder, by using rays 631, 632, and 633 generated in the first direction from reference points 621, 622, and 623.

A first ray 631 generated in the first direction from a first reference point 621, the first ray 631 may intersect the base at a first point 641, a second point 642, and a third point 643. In this case, the intraoral image processing device 100 may select the first point 641 and the third point 643 from among the first point 641, the second point 642, and the third point 643 which intersect the first ray 631, the first point 641 and the third point 643 having normal vectors in the same direction as the first ray 631, as candidate points. The intraoral image processing device 100 may select the first point 641, which is most adjacent to the first reference point 621, from among the candidate points, as a maximum point corresponding to the first reference point 621.

Also, the intraoral image processing device 100 may select a fourth point 644 having a normal vector in the same direction as a second ray 632 and most adjacent to a second reference point 622, from among points intersecting the second ray 632 generated in the first direction from the second reference point 622, as a maximum point corresponding to the second reference point 622.

Also, the intraoral image processing device 100 may select a fifth point 645 having a normal vector in the same direction as a third ray 633 and most adjacent to a third reference point 623, from among points intersecting the third ray 633 generated in the first direction from the third reference point 623, as a maximum point corresponding to the third reference point 623.

The intraoral image processing device 100 may obtain a point farthest from the reference circle 620, from among the maximum points corresponding to the reference points, respectively, as a maximum point of a side surface of a cylinder 650. Also, by using the same method, the intraoral image processing device 100 may determine a minimum point of the side surface of the cylinder, by using the rays generated in the second direction from the reference points. For example, the intraoral image processing device 100 may obtain a sixth point 646 as a minimum point of the side surface of the cylinder 650. Accordingly, the intraoral image processing device 100 may determine a vertical distance H1 between a fifth point 645 and a sixth point 646, the vertical distance H1 being parallel with a central axis of the cylinder 650, as a height of the side surface of the cylinder 650.

Figure 7:
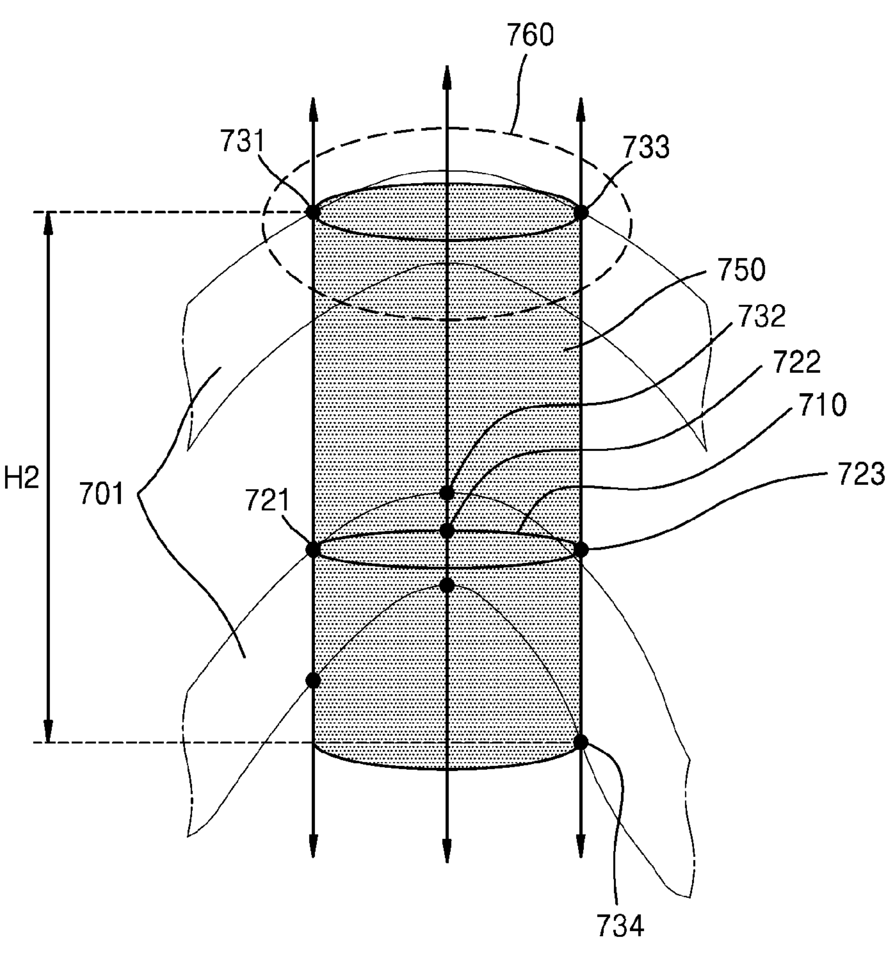
FIGS. 7 and 8 are diagrams for describing an operation, performed by an intraoral image processing device, of determining a height of a side surface of cylinders, according to another embodiment.
Figure 8:
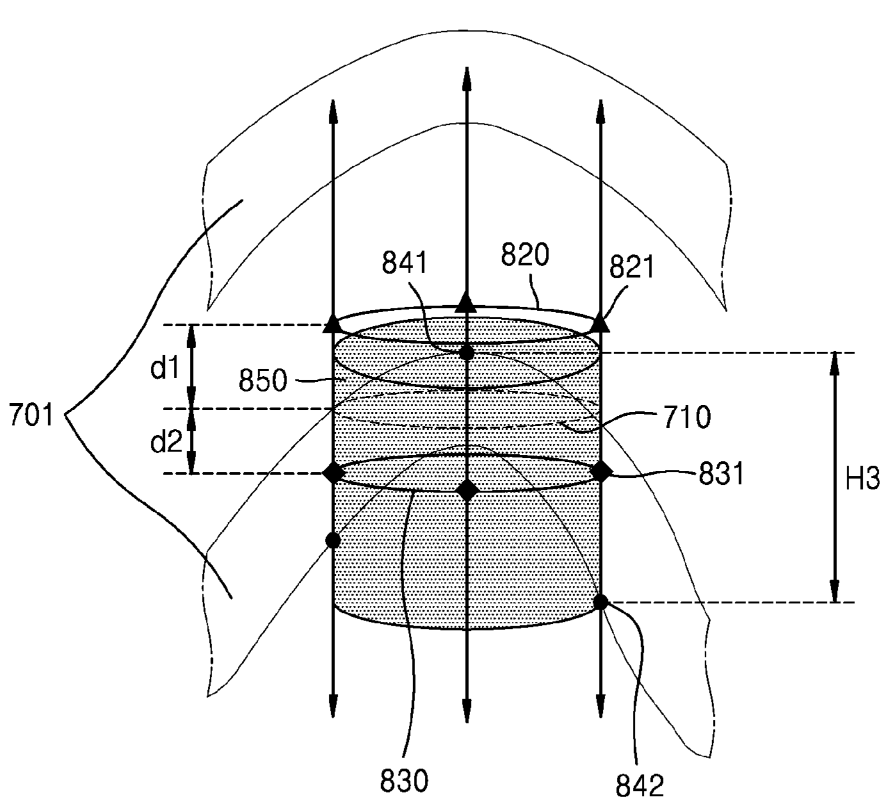

FIGS. 7 and 8 are diagrams for describing an operation, performed by an intraoral image processing device, of determining a height of a side surface of cylinders, according to another embodiment.

A base 701 illustrated in FIGS. 7 and 8 corresponds to a portion of the base illustrated in FIG. 5.

When a position of a reference circle is determined, as illustrated and described with reference to FIG. 6, it may happen that a maximum point or a minimum point of a side surface of a cylinder are wrongly determined. For example, referring to FIG. 7, the intraoral image processing device 100 may determine a maximum point of the side surface of the cylinder by determining a reference circle 710 and using rays generated in a first direction from a first reference point 721, a second reference point 722, and a third reference point 723 of the reference circle 710, by using the method illustrated and described with reference to FIG. 6. Here, a first point 731, a second point 732, and a third point 733 may be selected as maximum points in correspondence to the first reference point 721, the second reference point 722, and the third reference point 723, respectively, and the first point 731 farthest from the reference circle 710 from among the first, second, and third points may be obtained as the maximum point of the side surface of the cylinder 750. Also, a minimum point of the side surface of the cylinder may be determined by using rays generated in a second direction from the first to third reference points 721, 722, and 723, respectively. By using the same method as the method of determining the maximum point, a fourth point 734 may be obtained as the minimum point of the side surface of the cylinder 750.

Accordingly, the cylinder 750 having a vertical distance between the first point 731 and the fourth point 734 as a height H2 of the side surface may be generated. When a drain hole is generated by using the corresponding cylinder 750, the drain hole may be generated also in an unintended region 760. As illustrated in FIG. 7, when a range of the reference circle 710 determined by using the method illustrated and described with reference to FIG. 6 exceeds a range of a base 701 (for example, a portion of the reference circle 710 is positioned outside the base 701), the maximum point or the minimum point of the side surface of the cylinder may be wrongly determined, when the maximum point or the minimum point of the side surface of the cylinder is determined based on the reference circle 710.

Thus, the intraoral image processing device 100 according to an embodiment may determine the reference circle by using a different method, when the range of the reference circle 710 determined by using the method illustrated and described with reference to FIG. 6 exceeds the range of the base 701. This aspect is described in detail with reference to FIG. 8.

Referring to FIG. 8, the intraoral image processing device 100 may obtain a second reference circle 820 by moving the reference circle 710 of FIG. 7 by a first distance d1 in a first direction of a central axis of the cylinder. Also, the intraoral image processing device 100 may obtain a third reference circle 830 by moving the reference circle 710 of FIG. 7 by a second distance d2 in a second direction of the central axis of the cylinder.

The intraoral image processing device 100 may determine one or more of points included in a boundary of the second reference circle 820 as first reference points 821 and determine one or more of points included in a boundary of the third reference circle 830 as second reference points 831.

The intraoral image processing device 100 may generate rays in the second direction from the first reference points 821, the second direction being the opposite to the first direction, and may determine a minimum point of a side surface of the cylinder, based on points at which the rays intersect a base. Also, the intraoral image processing device 100 may generate rays in the first direction from the second reference points 831, the first direction being the opposite to the second direction, and may determine a maximum point of the side surface of the cylinder, based on points at which the rays intersect the base.

The intraoral image processing device 100 may generate a cylinder 850 having a vertical distance between a determined minimum point 842 and a determined maximum point 841 as a height H3 of the side surface of the cylinder. Accordingly, the intraoral image processing device 100 may generate a drain hole, based on the generated cylinder 850.

It is described above that the intraoral image processing device 100 may determine the reference circle by using the method illustrated and described with reference to FIG. 8, only when the range of the reference circle determined by using the method illustrated and described with reference to FIG. 6 exceeds the range of the base. However, the intraoral image processing device 100 is not limited thereto. The intraoral image processing device 100 according to an embodiment may determine the reference circle by using the method illustrated and described with reference to FIG. 8, also when the range of the reference circle determined by using the method illustrated and described with reference to FIG. 6 does not exceed the range of the base.

Figure 9:
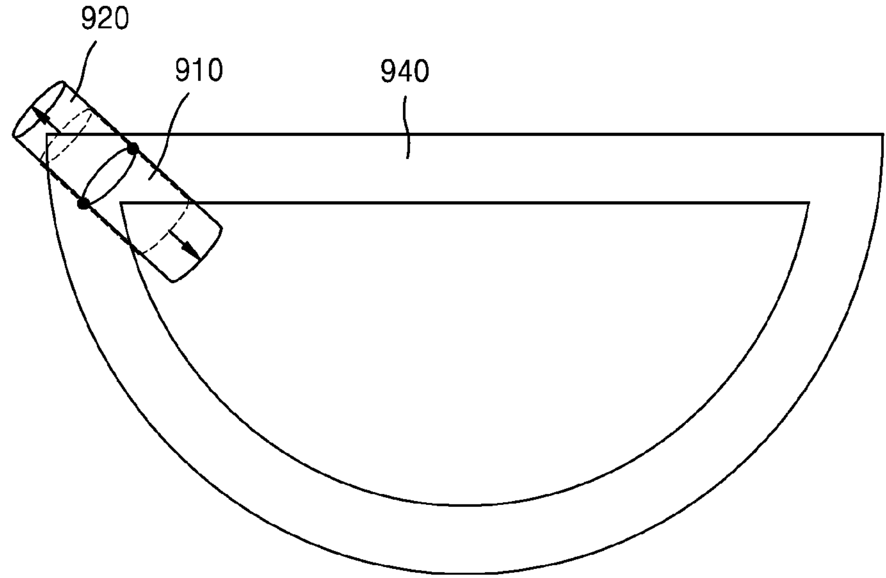
FIG. 9 is a diagram for describing an operation, performed by an intraoral image processing device, of determining a height of a side surface of a cylinder, according to an embodiment.

FIG. 9 is a diagram for describing an operation, performed by an intraoral image processing device, of determining a height of a side surface of a cylinder, according to an embodiment.

Referring to FIG. 9, the intraoral image processing device 100 according to an embodiment may determine a reference circle by using the method described with reference to FIG. 6 and may determine a maximum point and a minimum point of a side surface of a first cylinder 910, based on rays generated from one or more of boundary points of the reference circle. This aspect is described in detail with reference to FIG. 6, and thus, its detailed descriptions are omitted.

When the height of the side surface of the first cylinder 910 is determined by using the determined maximum point and the determined minimum point, the first cylinder 910 may not penetrate a wall of a base 940 at a boundary region of the base 940, as illustrated in FIG. 9.

Thus, in order to generate a second cylinder 920 in which a height of a side surface is further increased, the intraoral image processing device 100 according to an embodiment may move the maximum point of the side surface of the first cylinder 910 in a direction of a central axis of the cylinder by a predetermined first value and may move the minimum point of the side surface of the first cylinder 910 in a direction opposite to the central axis of the cylinder by a predetermined second value. Alternatively, the second cylinder 920 may be generated by applying an offset value to the maximum point and the minimum point of the side surface of the first cylinder 910. Accordingly, the second cylinder 920 may penetrate through the wall of the base also at the boundary region of the base.

Figure 10:
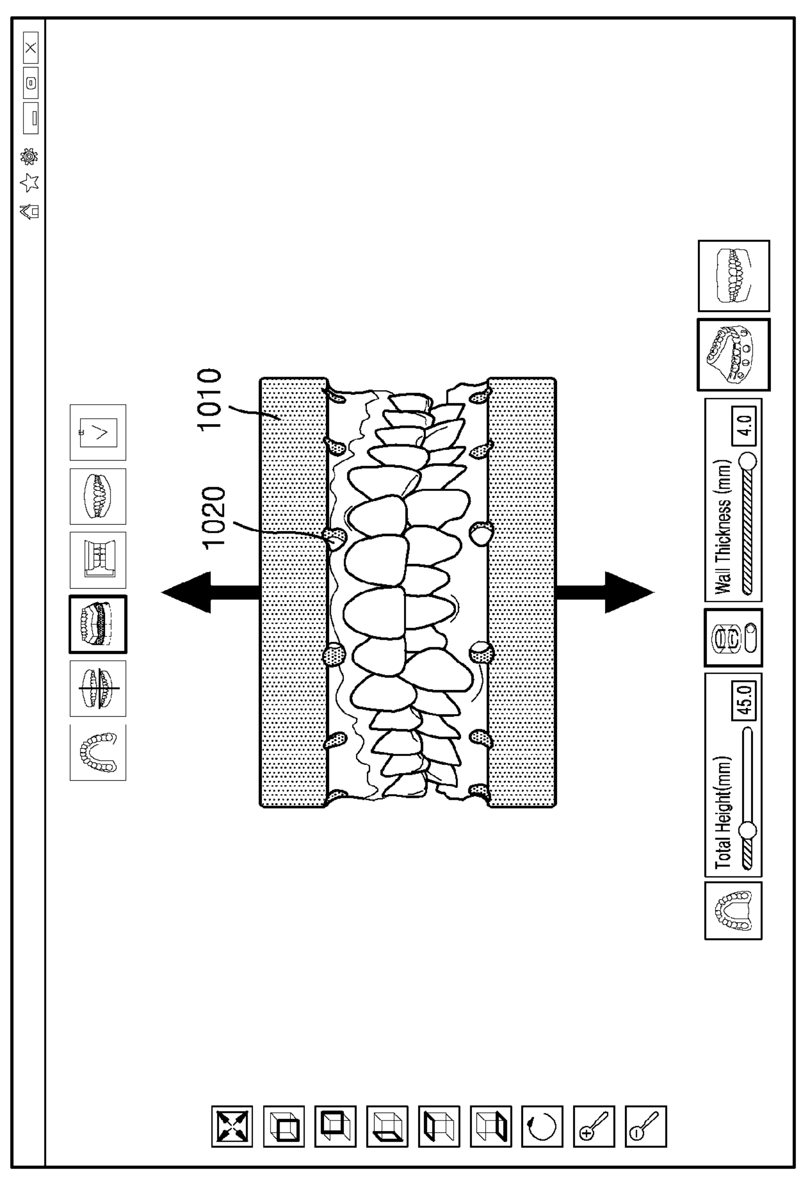
FIG. 10 is a diagram for describing an operation, performed by an intraoral image processing device, of generating teeth model data, according to an embodiment.

FIG. 10 is a diagram for describing an operation, performed by an intraoral image processing device, of generating teeth model data, according to an embodiment.

Referring to FIG. 10, the intraoral image processing device 100 according to an embodiment may use the scan data to generate the teeth model data combined with a base. The intraoral image processing device 100 may extend a gingiva region to the base, by generating mesh data between a boundary of the gingiva region included in the scan data and a base 1010. The base 1010 according to an embodiment may be generated as a hollow model, and a drain hole 1020 may be generated in the teeth model data. The intraoral image processing device 100 according to an embodiment generate the drain hole 1020 by deleting, in the teeth model data, data corresponding to one or more cylinders generated to penetrate through a wall of the base 1010.

The intraoral image processing device 100 according to an embodiment may not generate the drain hole 1020 in a teeth region. For example, when it is set that the drain hole 1020 is not generated in the teeth region, the intraoral image processing device 100 may separate the teeth region and the gingiva region in the scan data. The intraoral image processing device 100 may segment the teeth region and the gingiva region in the scan data. To segment the teeth region and the gingiva region in the scan data may denote to split teeth included in the scan data from a gingiva region. The intraoral image processing device 100 may segment the teeth region and the gingiva region by identifying scan data with respect to the teeth included in the scan data and scan data with respect to the gingiva included in the scan data.

Alternatively, the intraoral image processing device 100 may segment the teeth region and the gingiva region in the scan data by using artificial intelligence (AI) without a user input.

Alternatively, the intraoral image processing device 100 may segment the teeth region and the gingiva region by using curvature information of the scan data.

When one or more cylinders overlap the teeth region, the intraoral image processing device 100 may not delete data corresponding to the overlapping cylinders.

Alternatively, when one or more cylinders overlap the teeth region, the intraoral image processing device 100 may adjust positions of the cylinders overlapping the teeth region to be at the gingiva region or the base at which the cylinders do not overlap the teeth region.

As illustrated in FIG. 10, when the drain hole 1020 is generated to penetrate through the wall of the base 1010 included in the teeth model data, an inner material (for example, resins) may be easily discharged through the drain hole 1020, when manufacturing a teeth model of a hollow type by using the teeth model data.

Figure 11:
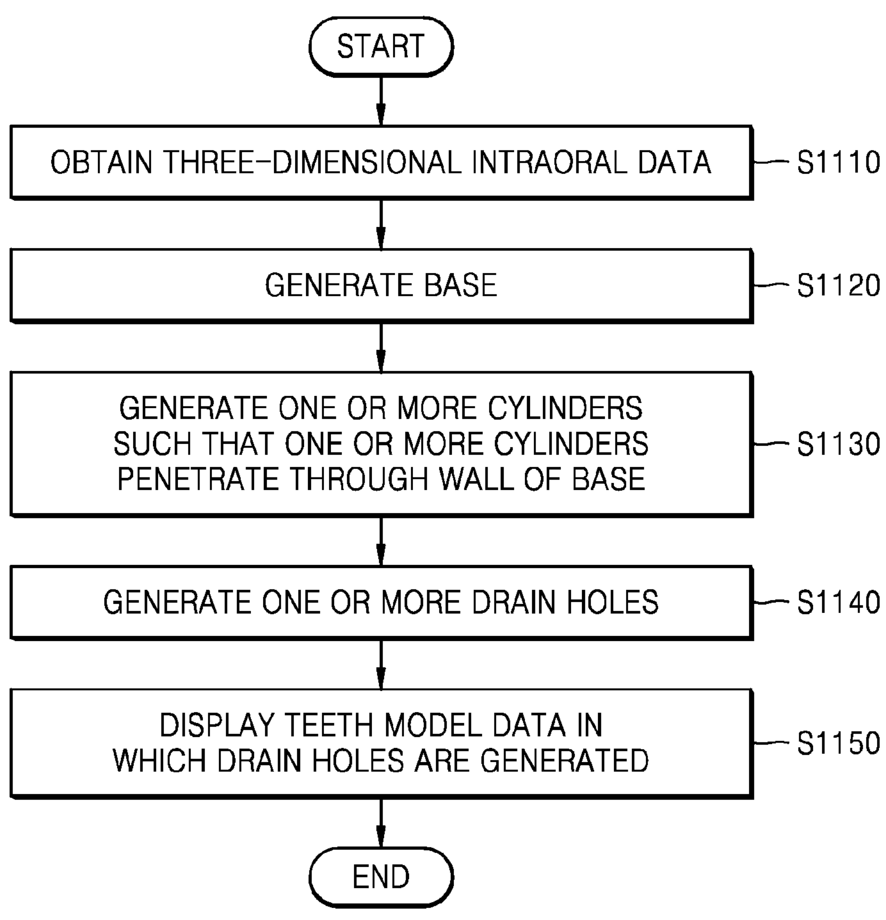
FIG. 11 is a flowchart of an intraoral image processing method according to an embodiment.

FIG. 11 is a flowchart of an intraoral image processing method according to an embodiment.

The intraoral image processing method illustrated in FIG. 11 may be performed by the intraoral image processing device 100.

Referring to FIG. 11, the intraoral image processing device 100 according to an embodiment may obtain 3D intraoral data (scan data) in operation S1110.

The intraoral image processing device 100 may receive raw data obtained by scanning an oral cavity including teeth or scanning a teeth model by using the intraoral scanner 10 and may generate the scan data based on the received raw data. Alternatively, the intraoral image processing device 100 may obtain the scan data stored in a memory. Alternatively, the scan data may be obtained from an external device or a server. However, the disclosure is not limited thereto.

The intraoral image processing device 100 may generate a base based on the scan data in operation S1120.

For example, the intraoral image processing device 100 may receive a user input for selecting a base generation menu and may enter into a base generation mode. In the base generation mode, the intraoral image processing device 100 may generate the base corresponding to the scan data and provide menus for setting a type of the base, a height of the base, whether or not to apply a hollow model, a thickness of a wall of the hollow model, the number of drain holes, etc. which are required to generate the base.

Based on the base, the intraoral image processing device 100 may generate one or more cylinders to penetrate a wall of the base in operation S1130.

For example, when a menu for generating the base as a hollow type is selected, the intraoral image processing device 100 may provide or activate a drain hole generation menu. When an input for generating a drain hole is received, the intraoral image processing device 100 may provide menus for setting information with respect to the drain hole.

When the information with respect to the drain hole including the number of drain holes, a diameter of the drain hole, a distance from the base to the drain hole, etc. is set through the drain hole setting menu, the intraoral image processing device 100 may generate cylinders corresponding to one or more drain holes.

Here, the intraoral image processing device 100 may determine a position of the cylinders, based on the number of drain holes and the distance from the base to the drain hole. Also, the intraoral image processing device 100 may determine one or more reference points with respect to each of the one or more cylinders and may generate rays from the determined reference points.

The intraoral image processing device 100 may determine a height of a side surface of the cylinders such that the one or more cylinders may penetrate through a wall of the base, based on points at which the rays intersect the base. A detailed method, performed by the intraoral image processing device 100, of determining the height of the side surface of the cylinders is given with reference to FIGS. 6 to 9, and thus, the same description is omitted.

The intraoral image processing device 100 may generate one or more drain holes by deleting data corresponding to one or more cylinders in teeth model data in operation S1140.

Here, the intraoral image processing device 100 may divide a teeth region and a gingiva region in the scan data and may control the drain hole not to be generated in the teeth region. For example, when one or more cylinders overlap the teeth region, the intraoral image processing device 100 may not delete data corresponding to the cylinders overlapping the teeth region. Alternatively, when one or more cylinders overlap the teeth region, the intraoral image processing device 100 may adjust positions of the overlapping cylinders to be at the gingiva region or the base at which the cylinders do not overlap the teeth region.

The intraoral image processing device 100 according to an embodiment may display the teeth model data in which drain holes are generated in operation S1150.

Figure 12:
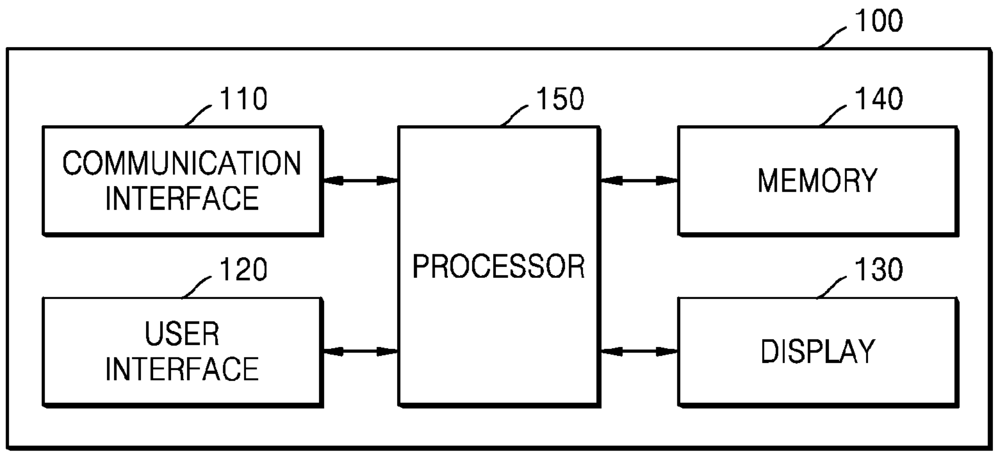
FIG. 12 is a block diagram of an intraoral image processing device according to an embodiment.

FIG. 12 is a block diagram of an intraoral image processing device according to an embodiment.

The intraoral image processing method illustrated in FIG. 11 may be performed by the intraoral image processing device 100. Thus, the intraoral image processing method illustrated in FIG. 11 may be a flowchart of operations of the intraoral image processing device 100.

Referring to FIG. 12, the intraoral image processing device 100 may include a communication interface 110, a user interface 120, a display 130, a memory 140, and a processor 150.

The communication interface 110 may perform communication with at least one external electronic device (for example, the intraoral scanner 10, a server, or an external medical device) through a wired or wireless communication network. The communication interface 110 may perform communication with at least one external electronic device according to control by the processor 150.

In detail, the communication interface 110 may include at least one short-range wireless communication module performing communication according to the communication standards, such as Bluetooth, Wifi, Bluetooth low energy (BLE), near-field communication (NFC)/radio-frequency identification (RFID), Wifi-direct, ultra-wide band (UWB), or Zigbee.

Also, the communication interface 110 may further include a remote communication module performing communication with a server for supporting remote communication according to the remote communication standards. In detail, the communication interface 110 may include the remote communication module performing communication through a network for Internet communication. Also, the communication interface 110 may include a remote communication module performing communication through a communication network according to the communication standards, such as the 3$^{rd}$ generation (3G), the 4$^{th}$ generation (4G), and/or the 5$^{th}$ generation (5G).

Also, in order to communicate with the external electronic device (for example, the intraoral scanner, etc.) in a wired manner, the communication interface 110 may include at least one port to be connected to the external electronic device through a wired cable. Accordingly, the communication interface 110 may perform communication with the external electronic device connected in a wired manner thorough the at least one port.

The user interface 120 may receive a user input for controlling the intraoral image processing device 100. The user interface 120 may include a user input device including a touch panel configured to sense a touch of a user, a button configured to receive a push manipulation of the user, a mouse or a keyboard configured to indicate or select a point on a user interface screen, or the like, but is not limited thereto.

Also, the user interface 120 may include a voice recognition device for voice recognition. For example, the voice recognition device may include a microphone, and the voice recognition device may receive a user's voice command or voice request. Accordingly, the processor 150 may control an operation corresponding to the voice command or the voice request to be performed.

The display 130 may display a screen. In detail, the display 130 may display a predetermined screen according to control by the processor 150. In detail, the display 130 may display a user interface screen including an intraoral image generated based on data obtained by the intraoral scanner 10 by scanning an oral cavity of a patient. Alternatively, the display 130 may display a user interface screen including information related to dental treatment of the patient.

The memory 140 may store at least one instruction. Also, the memory 140 may store at least one instruction executed by the processor 150. Also, the memory 140 may store at least one program executed by the processor 150. Also, the memory 140 may store data (for example, the raw data, etc. obtained through oral scanning) received from the intraoral scanner 10. Alternatively, the memory 140 may store an intraoral image three-dimensionally representing an oral cavity. The memory 140 according to an embodiment may include one or more instructions configured to generate a drain hole in teeth model data. The memory 140 according to an embodiment may include one or more instructions configured to perform the method described in this specification of generating the drain hole in the teeth model data.

The processor 150 may execute the one or more instructions stored in the memory 140 to control intended operations to be performed. Here, the one or more instructions may be stored in an internal memory of the processor 150 or in the memory 140 included in the intraoral image processing device separately from the processor 150.

In detail, the processor 150 may execute the one or more instructions to control one or more components included in the intraoral image processing device to perform intended operations. Thus, although the processor is described as performing predetermined operations, it may denote that the processor controls the one or more components included in the intraoral image processing device to perform predetermined operations.

The processor 150 according to an embodiment may be configured to execute the one or more instructions stored in the memory 140 to generate scan data based on raw data obtained by scanning an oral cavity including teeth or scanning a teeth model. Alternatively, the processor 150 may be configured to execute the one or more instructions stored in the memory 140 to obtain scan data pre-stored in the memory or obtain scan data from an external device.

The processor 150 may be configured to execute the one or more instructions stored in the memory 140 to generate a base based on the scan data. The processor 150 may be configured to execute the one or more instructions stored in the memory 140 to receive a drain hole generation input in a base generation mode and to provide menus for setting information with respect to a drain hole when the drain hole generation input is received.

When the information with respect to the drain hole including the number of drain holes, a diameter of the drain hole, a distance from the base to the drain hole, etc. is set through the drain hole setting menu, the processor 150 may be configured to execute the one or more instructions stored in the memory 140 to generate cylinders corresponding to one or more drain holes.

For example, the processor 150 may determine a position of the cylinders, based on the number of drain holes and the distance from the base to the drain hole. Also, the processor 150 may determine one or more reference points with respect to each of the one or more cylinders and may generate rays from the determined reference points.

Based on points at which the rays intersect the base, the processor 150 may determine a height of a side surface of the cylinders such that the one or more cylinders may penetrate through a wall of the base. A detailed method of determining the height of the side surface of the cylinders is described in detail with reference to FIGS. 6 to 9, and thus, the same description is omitted.

The processor 150 may be configured to execute the one or more instructions stored in the memory 140 to generate one or more drain holes by deleting, in teeth model data, data corresponding to the one or more cylinders. Here, the processor 150 may separate a teeth region and a gingiva region in the scan data and control the drain hole not to be generated in the teeth region. For example, when one or more cylinders overlap the teeth region, the processor 150 may not delete data corresponding to the overlapping cylinders. Alternatively, when one or more cylinders overlap the teeth region, the processor 150 may adjust positions of the cylinders overlapping the teeth region to be at the gingiva region or the base at which the cylinders do not overlap the teeth region.

The processor 150 according to an embodiment may be configured to execute the one or more instructions stored in the memory 140 to display the teeth model data in which the drain holes are generated.

The processor 150 according to an embodiment may be implemented as a form of processor internally including at least one internal processor and a memory device (for example, random-access memory (RAM), read-only memory (ROM), etc.) for storing at least one of a program, an instruction, a signal, and data to be processed or used by the internal processor.

Also, the processor 150 may include a graphic processing unit (GPU) for processing graphics data corresponding to video data. Also, the processor may be realized as a system on chip (SoC) combining a core and a GPU. Also, the processor may include a multi-core including more cores than a single-core. For example, the processor may include a dual core, a triple core, a quad core, a hexa core, an octa core, a deca core, a dodeca core, a hexadecimal core, or the like.

According to an embodiment of the disclosure, the processor 150 may generate an intraoral image based on a 2D image received from the intraoral scanner 10.

In detail, according to control by the processor 150, the communication interface 110 may receive data obtained by the intraoral scanner 10, for example, raw data obtained through intraoral scanning. Also, the processor 150 may generate a 3D intraoral image three-dimensionally representing an oral cavity, based on the raw data received from the communication interface 110. For example, the intraoral scanner 10 may include a camera L corresponding to a left field of view and a camera R corresponding to a right field of view in order to reconstruct a 3D image according to optical triangulation. Also, the intraoral scanner 10 may obtain image data L corresponding to the left field of view and image data R corresponding to the right field of view through the camera L and the camera R, respectively. Furthermore, the intraoral scanner may transmit the raw data including the image data L and the image data R to the communication interface 110 of the intraoral image processing device 100.

Then, the communication interface 110 may transmit the received raw data to the processor 150, and the processor 150 may generate, based on the received raw data, the intraoral image three-dimensionally representing the oral cavity.

Also, the processor 150 may directly receive the intraoral image three-dimensionally representing the oral cavity from an external server, a medical device, etc. by controlling the communication interface 110. In this case, the processor may not generate the 3D intraoral image based on the raw data and may obtain the 3D intraoral image.

According to an embodiment of the disclosure, that the processor 150 performs "extraction," "obtaining," "generating" operations, etc. may not only denote that the processor 150 directly performs the described operations by executing one or more instructions, but may also denote that the processor 150 controls other components to perform the described operations.

In order to realize one or more embodiments disclosed in this specification, the intraoral image processing device 100 may include only some of the components illustrated in FIG. 10 or may include more components than the components illustrated in FIG. 10.

Also, the intraoral image processing device 100 may store and execute exclusive software synchronized with the intraoral scanner. Here, the exclusive software may be referred to as an exclusive program, an exclusive tool, or an exclusive application. When the intraoral image processing device 100 operates in synchronization with the intraoral scanner 10, the exclusive software stored in the intraoral image processing device 100 may be connected with the intraoral scanner 10 and may receive, in real time, pieces of data obtained through intraoral scanning. For example, there may be exclusive software for processing data obtained through intraoral scanning, in the case of the i500 product, which is an intraoral scanner of Medit. In detail, Medit manufactures and distributes "Medit link," which is the software for processing, managing, using, and/or transmitting data obtained by an intraoral scanner (for example, i500). Here, the "exclusive software" refers to a program, a tool, or an application operable in synchronization with an intraoral scanner, and thus, the "exclusive software" may be shared by various intraoral scanners developed and sold by various manufacturers. Also, the described exclusive software may be separately manufactured and distributed from the intraoral scanner performing intraoral scanning.

The intraoral image processing device 100 may store and execute the exclusive software corresponding to the i500 product. The exclusive software may perform one or more operations for obtaining, processing, storing, and/or transmitting the intraoral image. Here, the exclusive software may be stored in the processor. Also, the exclusive software may provide a user interface for using the data obtained by the intraoral scanner. Here, a screen of the user interface provided by the exclusive software may include the intraoral image generated according to an embodiment of the disclosure.

The intraoral image processing method according to an embodiment of the disclosure may be realized as a program command which may be executed by various computer devices and may be recorded on a computer-readable recording medium. Also, according to an embodiment of the disclosure, a computer-readable storage medium having recorded thereon one or more programs including one or more instructions for executing the intraoral image processing method may be provided.

The computer-readable medium may include a program command, a data file, a data structure, etc. individually or in a combined fashion. Here, examples of the computer-readable storage medium include magnetic media, such as hard discs, floppy discs, and magnetic tapes, optical media, such as compact disc-read only memories (CD-ROMs) and digital versatile discs (DVDs), magneto-optical media, such as floptical discs, and hardware devices configured to store and execute program commands, such as ROMs, RAMs, and flash memories.

Here, a machine-readable storage medium may be provided in a form of a non-transitory storage medium. Here, the "non-transitory storage medium" may denote a tangible storage medium. Also, the "non-transitory storage medium" may include a buffer in which data is temporarily stored.

According to an embodiment, the intraoral image processing method according to various embodiments of the disclosure may be provided by being included in a computer program product. The computer program project may be distributed in the form of a device-readable storage medium (for example, CD-ROM). Alternatively, the computer program may be directly or through online distributed (e.g. download or upload) between two user devices (e.g., smartphones) through an application store (e.g. Play Store, etc.). In detail, the computer program product according to an embodiment of the disclosure may include a storage medium having recorded thereon a program including at least one instruction for executing the intraoral image processing method according to an embodiment of the disclosure.

Although embodiments are described in detail above, the scope of the claims of the disclosure is not limited thereto, and various modifications and alterations by one of ordinary skill in the art using basic concept of the disclosure defined by the following claims are also included in the scope of the claims of the disclosure.

The invention claimed is:

1. An intraoral image processing method comprising:

obtaining three-dimensional intraoral data that is data from scanning an object;

generating a base, based on the three-dimensional intraoral data;

displaying a user interface for setting a number of cylinders, a diameter of the cylinders, and a distance from the base to the cylinders;

receiving a user input with respect to the number of cylinders, the diameter of the cylinders, and the distance from the base to the cylinders through the user interface;

generating, based on the user input, a plurality of cylinders that penetrate through a wall of the base;

generating a plurality of drain holes by deleting data corresponding to the plurality of cylinders from teeth model data including the base; and displaying the teeth model data in which the plurality of drain holes are generated, and wherein horizontal positions of the plurality of cylinders are determined based on the number of cylinders and a boundary of the base, and vertical positions of the plurality of cylinders are determined based on the distance from the base to the cylinders.

2. The intraoral image processing method of claim 1, wherein the generating of the plurality of cylinders comprises:

determining one or more reference points with respect to the plurality of cylinders;

generating rays from the one or more reference points and, based on points at which the rays intersect the base, determining a height of a side surface of the plurality of cylinders such that the plurality of cylinders penetrate through the wall of the base; and generating the plurality of cylinders, based on the determined height of the side surface.

3. The intraoral image processing method of claim 2, wherein the determining of the one or more reference points comprises:

based on an outline of the base and a thickness of the wall of the base, determining a position of a reference circle having a diameter of a bottom surface of the plurality of cylinders; and determining one or more points included in the reference circle as the one or more reference points.

4. The intraoral image processing method of claim 2, wherein the rays comprise first rays having a first direction and second rays having a second direction that is opposite to the first direction, and the determining of the height of the side surface of the plurality of cylinders comprises:

determining a minimum point of the side surface of the plurality of cylinders, based on first points at which a normal vector is in the first direction, from among points at which the first rays intersect the base;

determining a maximum point of the side surface of the plurality of cylinders, based on second points at which a normal vector is in the second direction, from among points at which the second rays intersect the base; and determining the height of the side surface of the plurality of cylinders, based on a vertical distance between the minimum point and the maximum point.

5. The intraoral image processing method of claim 4, wherein the determining of the height of the side surface of the plurality of cylinders further comprises determining the height of the side surface of the plurality of cylinders by additionally applying a pre-set value to the determined maximum point and the determined minimum point.

6. The intraoral image processing method of claim 1, further comprising obtaining a teeth region including teeth in the three-dimensional intraoral data, wherein the generating of the plurality of drain holes comprises, based on whether or not the plurality of cylinders overlap the teeth region, deleting data corresponding to the plurality of cylinders.

7. The intraoral image processing method of claim 1, further comprising obtaining the teeth model data including the base, by generating mesh data extending from a boundary of the three-dimensional intraoral data to the base.

8. An intraoral image processing device comprising:

a display;

a memory storing one or more instructions; and a processor configured to execute the one or more instructions stored in the memory to:

obtain three-dimensional intraoral data that is data from scanning an object;

generate a base, based on the three-dimensional intraoral data;

control the display to display a user interface for setting a number of cylinders, a diameter of the cylinders, and a distance from the base to the cylinders;

receive a user input with respect to the number of cylinders, the diameter of the cylinders, and the distance from the base to the cylinders through the user interface;

generate, based on the user input, a plurality of cylinders that penetrate through a wall of the base;

generate a plurality of drain holes by deleting data corresponding to the plurality of cylinders from teeth model data including the base; and control the display to display the teeth model data in which the plurality of drain holes are generated, and wherein horizontal positions of the plurality of cylinders are determined based on the number of cylinders and a boundary of the base, and vertical positions of the plurality of cylinders are determined based on the distance from the base to the cylinders.

9. The intraoral image processing device of claim 8, wherein the processor is further configured to execute the one or more instructions stored in the memory to:

determine one or more reference points with respect to the plurality of cylinders;

generate rays from the one or more reference points and, based on points at which the rays intersect the base, determine a height of a side surface of the plurality of cylinders such that the plurality of cylinders penetrate through the wall of the base; and generate the plurality of cylinders, based on the determined height of the side surface.

10. The intraoral image processing device of claim 9, wherein the processor is further configured to execute the one or more instructions stored in the memory to, based on an outline of the base and a thickness of the wall of the base, determine a position of a reference circle having a diameter of a bottom surface of the plurality of cylinders, and determine one or more points included in the reference circle as the one or more reference points.

11. The intraoral image processing device of claim 9, wherein the rays comprise first rays having a first direction and second rays having a second direction that is opposite to the first direction, and the processor is further configured to execute the one or more instructions stored in the memory to:

determine a minimum point of the side surface of the plurality of cylinders, based on first points at which a normal vector is in the first direction, from among points at which the first rays intersect the base;

determine a maximum point of the side surface of the plurality of cylinders, based on second points at which a normal vector is in the second direction, from among points at which the second rays intersect the base; and determine the height of the side surface of the plurality of cylinders, based on a vertical distance between the minimum point and the maximum point.

12. The intraoral image processing device of claim 9, wherein the processor is further configured to execute the one or more instructions stored in the memory to determine the height of the side surface of the plurality of cylinders by additionally applying a pre-set value to the determined maximum point and the determined minimum point.

13. The intraoral image processing device of claim 8, wherein the processor is further configured to execute the one or more instructions stored in the memory to:

obtain a teeth region including teeth in the three-dimensional intraoral data; and based on whether or not the plurality of cylinders overlap the teeth region, delete data corresponding to the plurality of cylinders.

14. The intraoral image processing device of claim 8, wherein the processor is further configured to execute the one or more instructions stored in the memory to obtain the teeth model data including the base by generating mesh data extending from a boundary of the three-dimensional intraoral data to the base.

15. A non-transitory computer-readable recording medium having recorded thereon a program comprising one or more instructions for executing, on a computer, an intraoral image processing method comprising:

obtaining three-dimensional intraoral data that is data from scanning an object;

generating a base, based on the three-dimensional intraoral data;

displaying a user interface for setting a number of cylinders, a diameter of the cylinders, and a distance from the base to the cylinders;

receiving a user input with respect to the number of cylinders, the diameter of the cylinders, and the distance from the base to the cylinders through the user interface;

generating, based on the user input, a plurality of cylinders that penetrate through a wall of the base;

generating a plurality of drain holes by deleting data corresponding to the plurality of cylinders from teeth model data including the base; and displaying the teeth model data in which the plurality of drain holes are generated, and wherein horizontal positions of the plurality of cylinders are determined based on the number of cylinders and a boundary of the base, and vertical positions of the plurality of cylinders are determined based on the distance from the base to the cylinders.

* * * * *